United States Patent [19]

Johnson, Jr.

[11] 4,375,639
[45] Mar. 1, 1983

[54] SYNCHRONOUS BUS ARBITER

[75] Inventor: Mize Johnson, Jr., West Melbourne, Fla.

[73] Assignee: Harris Corporation, Melbourne, Fla.

[21] Appl. No.: 224,070

[22] Filed: Jan. 12, 1981

[51] Int. Cl.³ .............................................. H04Q 9/00
[52] U.S. Cl. .................................. 340/825.5; 364/200
[58] Field of Search ............................ 370/91, 94, 85; 340/825.5, 825.51; 364/200, 900

[56] References Cited

U.S. PATENT DOCUMENTS

| 3,445,822 | 5/1969 | Driscoll | 364/200 |
| 4,038,644 | 7/1977 | Duke et al. | 364/900 |
| 4,120,029 | 10/1978 | Steiner | 364/200 |
| 4,229,791 | 10/1980 | Levy et al. | 364/200 |
| 4,229,792 | 10/1980 | Jensen et al. | 370/85 |
| 4,281,380 | 7/1981 | DeMesa et al. | 370/94 |

Primary Examiner—Donald J. Yusko
Attorney, Agent, or Firm—Antonelli, Terry & Wands

[57] ABSTRACT

A bus arbitration arrangement for resolving competing requests for access to a bus is associated with local signal control lines, that are coupled to its associated "master" (i.e. user of the bus), and control lines of the bus common to all other units. These local signal control lines include a set of identification lines defining the address (and priority rank) of the associated master, a request line through which the master requests access to the bus, a grant line through which a master is informed that it has control of the bus, and a release line through which the master informs the bus exchange control circuit that it is releasing its control of the bus.

Control lines which are common to other units on the bus include a busy line, through which each interface circuit is advised that the bus is currently in use, a bus clock line for synchronizing the operation of the bus exchange control circuits, a set of bus request lines over which the addresses of users requesting control of the bus are conveyed and through which priority among conflicting requests is resolved, and a select acknowledgement line which is used to terminate priority resolution once it has been determined which requesting user has highest priority.

The bus exchange control circuit itself contains a set of combinational logic, which carries out a set of housekeeping chores using the control signal lines, so as to enable its associated master to gain control of the bus when requested and, in the event of a plurality of simultaneous requests, resolving those requests in favor of the master whose identification lines indicate the highest priority among potential users of the bus.

26 Claims, 6 Drawing Figures

SYNCHRONOUS BUS ARBITER

FIELD OF THE INVENTION

The present invention relates to data communication systems and, more particularly, to an arbitration circuit for resolving priority among a number of master stations competing for use of a common data bus.

BACKGROUND OF THE INVENTION

In digital data communication systems, it is common practice to provide a communication bus, shared in common by a plurality of data transceiver units, over which messages are conveyed among the users of the system. These users may include one or more processor units, memory, peripherals, intrabus interface units, etc. In order that messages may be sent without interfering with one another, the system is usually provided with a bus management arrangement which provides an orderly manner of permitting access to and use of the bus by the various units that are coupled to it. Among various schemes that have been proposed for this purpose are polling arrangements, wherein a preassigned central controller polls the individual units in a predetermined order, in order to determine if any unit desires to use the bus. The central controller grants access to the bus to the respective users of the bus only when that respective user is polled. In another type of system, rather than use a central polling station, a user access scheme is integrated among the users of the bus, whereby each unit is assigned a predetermined priority, usually hard-wired in each unit, and access to the bus is passed from one user to the next along the bus, from the highest preassigned priority device to the lowest preassigned priority device. In yet another type of system, either a central bus controller, or each unit along the bus, contains a priority resolution or bus arbitration subsystem which allocates use of the bus to the user having the highest priority among a plurality of units making concurrent requests for use of the bus. In these types of schemes, priority resolution may be accomplished by scanning a table of requests in a predetermined order and allocating use to the table location having highest priority, or providing an access lock-out scheme, whereby a higher priority unit effectively prevents or locks out others of lower priority from gaining access to the bus.

Unfortunately, proposals such as those described briefly above suffer from a number of disadvantages. Those systems which employ a central controller require extra hardware, and the extra time involved in polling or scanning techniques decreases the speed of the system. Similarly, simply incorporating some sort of priority resolving device into each unit along the bus has not in and of itself been particularly attractive since, as pointed out above, extra lock out logic integrated among the users of the bus is required, and bus access is still effected basically in a serial or chain fashion. For examples of priority resolution schemes of the type explained above, attention may be directed to the following U.S. Patents: Appelt, U.S. Pat. No. 3,886,524; Miu et al U.S. Pat. No. 4,050,097; Keller et al U.S. Pat. No. 3,983,540; Barlow U.S. Pat. No. 4,030,075; Nakamura U.S. Pat. No. 3,710,351; McLagen et al U.S. Pat. No. 4,418,011; Hauch U.S. Pat. No. 3,629,854; Nitta et al U.S. Pat. No. 4,106,104; Ledeen et al U.S. Pat. No. 3,742,148; Suzuki et al U.S. Pat. No. 4,151,592; Yamada U.S. Pat. No. 3,813,651; Schlotlerer U.S. Pat. No. 4,130,864; Valassis U.S. Pat. No. 3,959,759; Kronies et al U.S. Pat. Nos. 3,919,692 3,919,692; Ying U.S. Pat. No. 4,150,429; Seichter et al U.S. Pat. No. 3,456,244; Duke et al U.S. Pat. No. 4,038,644; Driscoll U.S. Pat. No. 3,445,822; and Ito, U.S. Pat. No. 3,978,451.

SUMMARY OF THE INVENTION

In accordance with the present invention, deficiencies of previously proposed priority resolution schemes are overcome by a new and improved bus request arbitration arrangement that is capable of resolving competing requests for access to the bus simultaneously with a reduced amount of hardware and with improved access time. For this purpose, each user is interfaced with a commonly shared bus by way of its own associated bus exchange control circuit through which requests for service and priority resolution, in the event of a conflict, are handled. Each user possesses communication support capability, i.e. intelligence, so that it may ask for and gain control of the bus through its associated bus exchange control circuit.

The bus exchange control circuit is coupled to prescribed local signal control lines, that are coupled to its associated "master" (i.e. user of the bus), and control lines of the bus common to all other units. These local signal control lines include a set of identification lines defining the address (and priority rank) of the associated master, a request line through which the master requests access to the bus, a grant line through which a master is informed that it has control of the bus, and a release line through which the master informs the bus exchange control circuit that it is releasing its control of the bus.

Control lines which are common to other units on the bus include a busy line, through which each interface circuit is advised that the bus is currently in use, a bus clock line for synchronizing the operation of the bus exchange control circuits, a set of bus request lines over which the addresses of users requesting control of the bus are conveyed and through which priority among conflicting requests is resolved, and a select acknowledgement line which is used to terminate priority resolution once it has been determined which requesting user has highest priority.

The bus exchange control circuit itself contains a set of combinational logic, to be described in detail below, which carries out a set of housekeeping chores using the control signal lines enumerated above, so as to enable its associated master to gain control of the bus when requested and, in the event of a plurality of simultaneous requests, resolving those requests in favor of the master whose identification lines indicate the highest preassigned priority among potential users of the bus.

DETAILED DESCRIPTION

Figure 1:
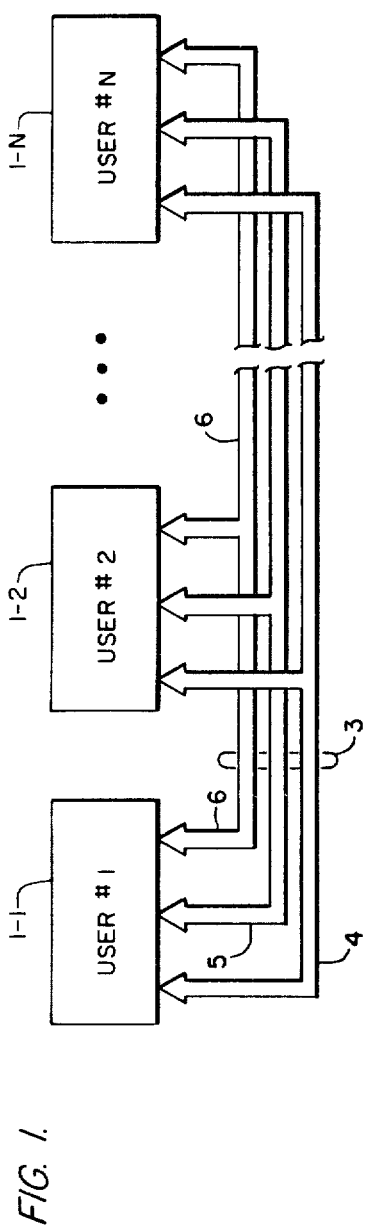
FIG. 1 is a block diagram illustration of a data communication network in which the arbitration circuit of the present invention may be employed.

Referring now to FIG. 1, there is illustrated a typical configuration of a distributed data communication network in which a distributed bus 3 is shared in common by a plurality of users 1-1 . . . 1-N. In a multiprocessor environment, for example, the respective users may include terminal devices such as processors, memory, peripherals, I/O units, modems, etc. The particular type of user device is not important for purposes of understanding the present invention or a distributed communication network, in general. These examples are referenced simply to illustrate an environment in which the present invention may be employed. For the distributed user architecture shown in FIG. 1, communication bus 3 includes a data bus portion 4 made up of a prescribed number (e.g. eight) of parallel data bus lines, an address bus portion 5 made up of a prescribed number (e.g. sixteen) of parallel address bus lines, and a control bus portion 6, made up of a prescribed number of parallel control bus lines. It should be noted that the number of or grouping of the bus lines is not critical and may vary as system requirements vary, so that the details thereof will not, for the most part, be described here. However, as the constituency of the bus access portion of the control lines does relate to the inventive bus arbitration scheme, it will be described in detail, in order that a full understanding of the present invention may be afforded.

Figure 2:
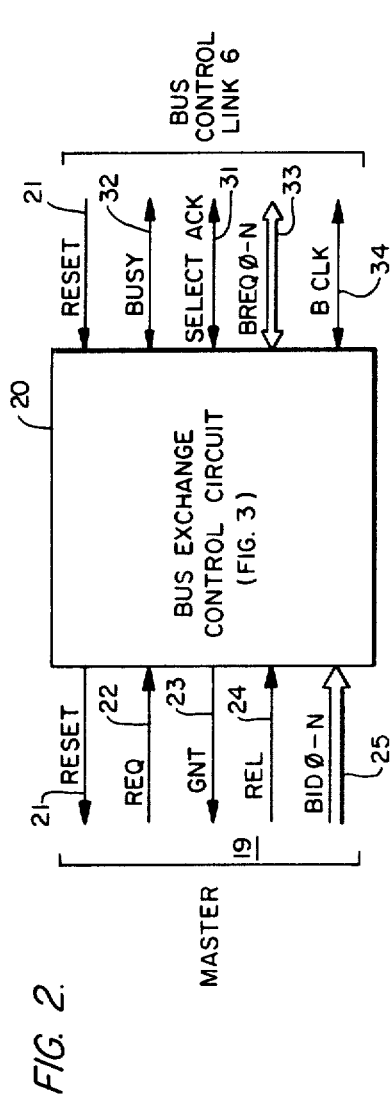
FIG. 2 is a block illustration of the coupling of control lines to the bus exchange control circuit of the present invention.

Attention is now directed to FIG. 2, which shows a block illustration of the coupling of the bus control lines to the bus exchange control circuit for an individual user 1-i. As explained previously, each user is capable of requesting and gaining control of the bus 3 and therefore is assumed to be processor-based, so that it may generate and receive messages transmitted over the bus. As such, each user will be termed a "master"; i.e. once it requests and is granted control of the bus it is the master of communications over the bus until it relinquishes control of the bus at the end of its communication. During this time it may both transmit and receive messages relative to selectively addressed stations along the bus. Such stations may include passive units that are incapable of gaining control of the bus and they may include other masters. The important aspect of such units is that any unit that is capable of requesting access to and gaining control of the bus is a master and does contain the bus arbitration circuitry of the present invention.

The bus exchange control circuit 20 itself, which will be described in detail below in conjunction with the description of FIG. 3, effectively interfaces the bus control lines of the control portion 6 of the communication bus 3 to the message assembly and receiver part of the master station, and it is through this bus exchange control circuit that the master acquires control of the bus when it wishes to communicate. The actual messages themselves are conveyed over the address and data portion of the bus and need not be described here. It should also be realized that the address/data bus configuration need not be parallel as shown but may be configured in a serial fashion, without departing from its capability of enjoying its association with the present invention.

As explained briefly above, between the master and its associate bus exchange control circuit 20 is a master interface control link 19 made up of a number of master interface bus control lines 21 to 25, through which access to the bus is obtained. These include a reset or initialize line 21, common to all users of the bus through which the control circuits are reset on system initialization at power up. This clears all units and prepares the system for operation. The reset or initialize line 21 will not be further described as it is not employed for each communication request. Line 22 is a bus control request line over which the master couples a prescribed signal whenever the master desires to use the bus. Line 23 is a grant line used by the bus exchange control circuit 20 to inform the requesting master that it has been given control of the bus and may proceed to communicate. Until the master sees a grant signal on line 23, it may not communicate. Line 24 is a bus release line employed by the master to inform its associated bus exchange control circuit that it has completed its communication and no longer needs the bus. This effectively frees the bus for use by other masters. An additional link 25 may comprise a multi bit identification code corresponding to the address of the master. For example, for a sixteen slot position card cage, link 25 may be comprised of a four bit address link over which the master's card position code is coupled. For purposes of a simplified priority hierarchy, the sixteen card slot positions may be numbered 0 (0000) to 15 (1111), with 0000 identifying the master having lowest priority and 1111 identifying the master having highest priority. Of course, the numbers of bus lines and card slot positions are not limited to four and sixteen, respectively, but may be varied to meet system design requirements as the case demands.

The commonly shared bus control lines 6 to which each bus exchange control circuit along the bus is coupled includes, in addition to the reset line 21 referenced above, a select acknowledge line 31 which is used to terminate an arbitration cycle once highest priority has been established by the bus exchange control circuit 20. Namely, when one of the bus exchange control circuits 20 is responding to a request for access to the bus by its associated master and has determined that its master has priority, it couples a signal over the select acknowledge line 31 to the other users of the bus, preventing the execution of a priority resolution cycle in any other bus exchange control circuit at that time. Busy line 32 provides a signal to each circuit along the bus whenever a master has control of the bus, so that no bus request will be honored until the bus is released by the current controlling master. Link 32 is comprised of a plurality of user identification bus request links which are selectively coupled together in the manner shown in FIG. 4, to be described in detail below, over which card slot address codes (0000-1111) of bus requesting masters are coupled, and in accordance with which priority among such conflicting requesters is resolved by one of the bus exchange control circuits. As will be explained in detail below in conjunction with the description of FIG. 3, bus request lines 33 are coupled to open collector gates and, by virtue of the selective strapping-together of these lines in the manner shown in FIG. 4, priority among simultaneously handled requests is granted to the master having the highest priority (i.e. highest binary value) identification code. Line 34 carries a system bus clock among all the users of the communication bus and serves to ensure synchronized bus arbitration operations, regardless of the time of receipt of requests from the masters.

Figure 3:
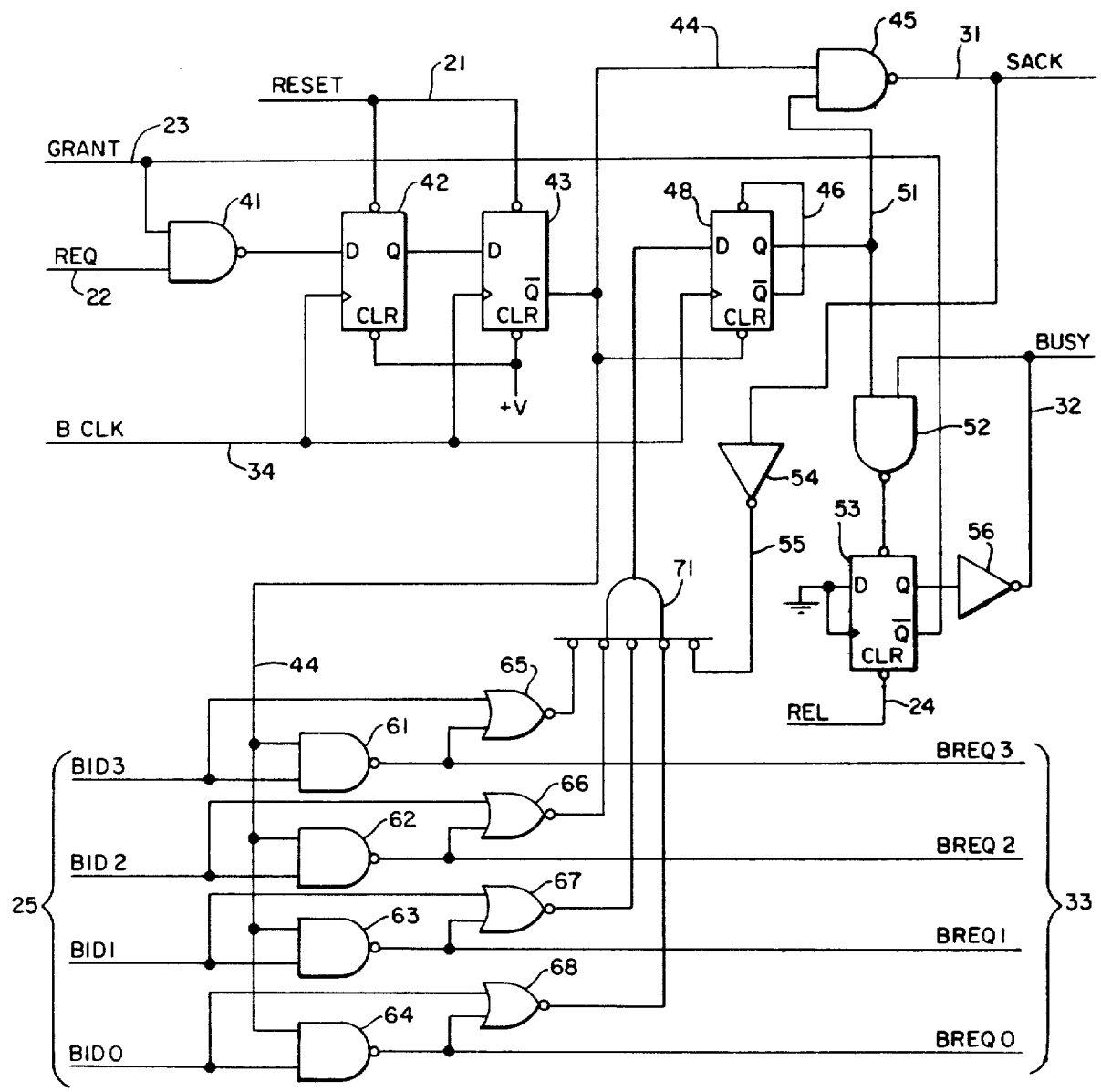
FIG. 3 is a detailed schematic logic diagram of a bus exchange control circuit in accordance with the present invention.

Referring now to FIG. 3, there is shown a detailed schematic of the bus arbitration circuitry contained within the bus exchange control circuit 20 shown in FIG. 2. Within the bus exchange control circuit there are a pair of flip-flops 42 and 43 which control the synchronizing of the operation of an arbitration cycle in response to a communication request signal from an associated master on line 22. Flip-flops 42 and 43 are clocked by the bus clock signal on line 34. Upon initialization, flip-flops 42 and 43 are normally set by the initialization signal on line 21. This causes their Q outputs to go high or be in a "1" state. The bus grant line 23 and the bus request line 22 are coupled as respective inputs of NAND gate 41, the output of which is coupled to the D input of flip-flop 42. The Q output of flip-flop 42 is coupled to the D input of flip-flop 43. The $\overline{Q}$ output of flip-flop 43 on line 44 is a synchronized or de-bounced request signal which begins an arbitration cycle within two clock cycles after a bus request has been applied over line 22. Line 44 is coupled to one input of NAND gate 45 and to one input of each of NAND gates 61 to 64. It is also coupled to the CLEAR input of flip-flop 48, the Q output of which is coupled over line 51 to one input of NAND gate 52 and a second input of NAND gate 45. The Q output of flip-flop 48 is coupled over line 46 to its preset input. Flip-flop 48 responds to an arbitration priority signal from NOR gate 71 and controls the generation of busy, bus grant, and select acknowledge signals, as will be explained in detail below.

The output of NAND gate 45 is an open collector line coupled to select acknowledge line 31 and, through an inverter 54, to one input of NOR gate 71. Select acknowledge line 31 is employed to terminate an arbitration cycle, once priority is granted to a requesting master. The other inputs of NOR gate 71 are derived from the outputs of a set of NOR gates 65-68, one input of each of which is supplied from the card slot identification lines (BID 0 to BID 3) 25 and the other inputs of which are coupled to the outputs of respective NAND gates 61 to 64 and bus request lines (BREQ 0 to BREQ 3) 33. NAND gates 61 to 64 have open collector outputs coupled to lines 33 so that a "0" level on any of the lines 33 from one of the NAND gates 61 to 64 will override a "1" level on these lines from a NAND gate in another bus exchange control circuit connected to the bus request lines.

As mentioned previously, the Q output of flip-flop 48 is coupled over line 51 to one input of NAND gate 52. The output of NAND gate 52 is coupled to flip-flop 53 as a hard set input. The Q output of flip-flop 53 is coupled through inverter 56 to busy line 32. The $\overline{Q}$ output of flip-flop 53 is coupled over line 23 to supply the bus grant signal to the master and to supply a signal to NAND gate 41. A bus release signal from the master is coupled over line 24 to the CLEAR input of flip-flop 53.

Figure 4:
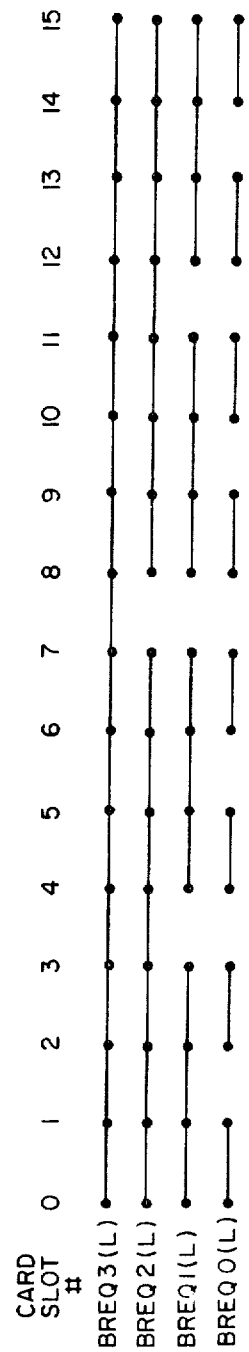
FIG. 4 is a backplane connection diagram for the bus request lines BREQ employed in accordance with the present invention.

In order to fully appreciate the manner in which the bus arbitration logic of the bus exchange control circuit of FIG. 3 operates, the manner in which the bus request lines of the various arbitration circuits of the units along the link are interconnected should be understood. FIG. 4 illustrates the manner in which the bus request lines BREQ 0 to BREQ 3 may be selectively interconnected or strapped on the backplane of the card cage. As is shown in the Figure, sixteen card slot positions are provided, with the most significant bit of the four-bit identification code for each card slot position, namely the BREQ 3 bit terminal, being connected to that same terminal for each card slot. For the next most significant bit position, namely bit BREQ 2, card slot positions 0-7 are connected in common with each other and card slot positions 8-15 are connected in common with each other, but not in common with the first set of card slot positions 0-7.

Similarly, in a further sub-divided manner, for the second least significant bit position, namely BREQ 1, card slot positions 0-3 are connected together, card slot positions 4-7 are connected together, card slot positions 8-11 are connected together, and card slot positions 12-15 are connected together. Finally, for the least significant bit position, adjacent pairs of card slot positions are connected together, with separation between adjacent pairs as shown. Through the combination of this interconnection of the card slot position code reference lines BREQ 0 to BREQ 3 on the backplane and the combinational logic shown in FIG. 3, the arbitration or priority resolving circuitry of the present invention is capable of handling a plurality of simultaneous requests and executing a priority resolution cycle for those plurality of requests, granting priority to the highest designated priority or card slot position master, with a simplified circuitry format and within a relatively short period of time, as compared with conventional approaches.

Considering now the operation of the bus arbitration circuitry of the present invention, let it be initially assumed that only one of the users of the bus, namely only one master, is requesting service at a particular time, so that there is really no need for an arbitration. Still, the requests are handled through the bus exchange control circuitry and control of the bus is handled through this circuitry. Let it be assumed that card slot position number 1, having identity code 0001 is requesting use of the bus, the bus is not busy, and no other master is presently requesting use of the bus.

Figure 5:
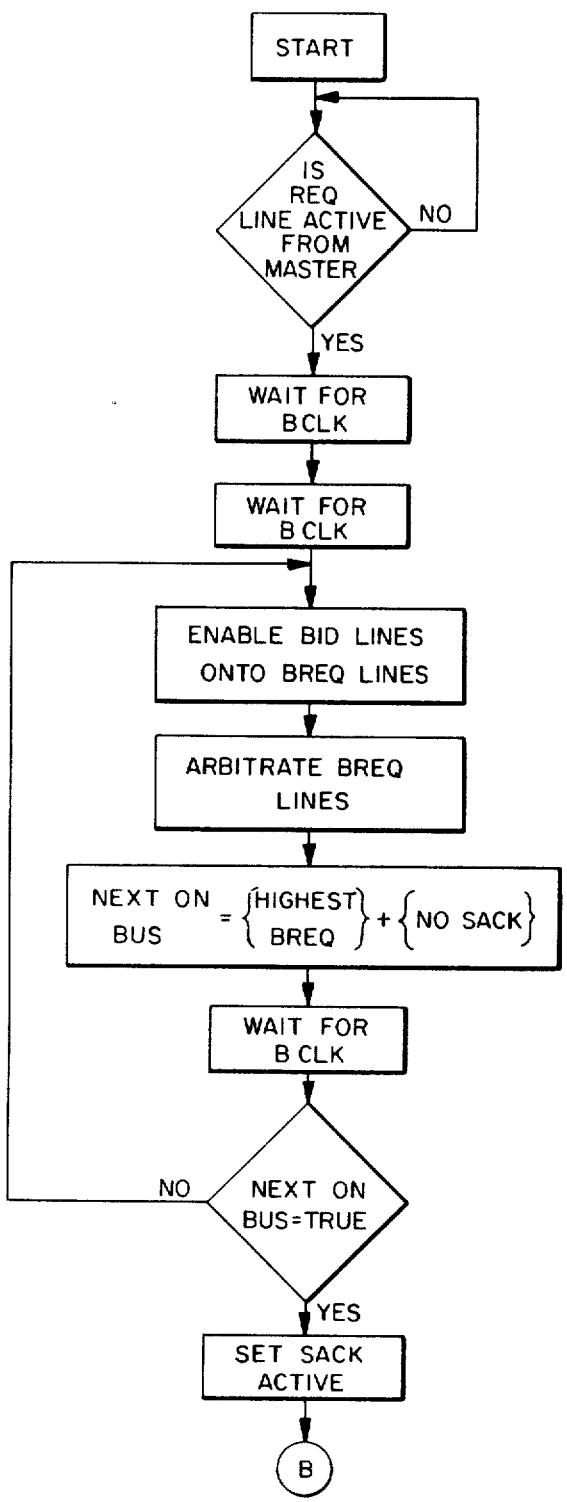
FIGS. 5 and 6 together illustrate a flow chart of the operation of the bus arbitration logic shown in FIG. 3.
Figure 6:
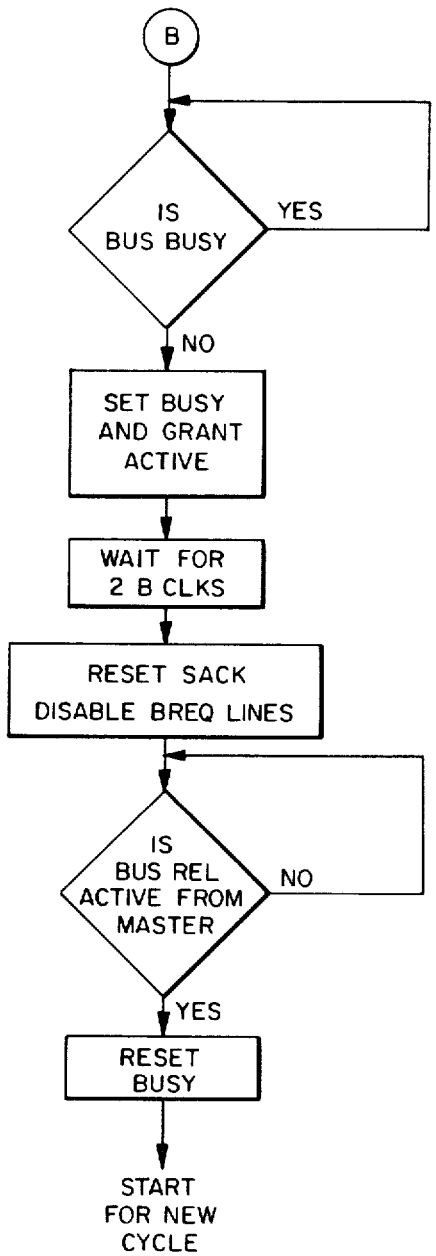

For the arbitration circuit under consideration, a card slot identification code of the master of interest is hardwired to respective inputs of NAND gates 61-64 and NOR gates 65-68. Each of NAND gates 61-63 and NOR gates 65-67 will receive a zero at one of its inputs while a one will be supplied to corresponding input of each of NAND gates 64 and 68, namely at the least significant bit position for the code 0001. Flip-flops 42 and 43 are initially set, with the $\overline{Q}$ output of flip-flop 43 being reset or low so that flip-flop 48 is also held reset by the low level on line 44. With a zero at the $\overline{Q}$ output flip-flop 43 on line 44, the output of NAND gate 45 on line 31 is a one or high, so that SACK is not asserted. This high level is inverted by inverter 54 and applied to one input of NOR gate 71. Flip-flop 53 is reset with a one being applied over line 23 to one input of NAND gate 41 and, via inverter 56, a zero is applied to one input of NAND gate 52. This puts a one at its output, which is inverted at the inverting input of the hard-set pullup input to flip-flop 53. Thus, flip-flop 53 remains reset, so that a high level or non-busy indicating signal is applied over busy line 32 to all of the other arbitration logic circuits along the bus. Under these conditions, each bus exchange control circuit sees the bus not busy. To facilitate an understanding of the request-arbitrate-grant-release scenario to be described below, attention may be directed to the operational flow chart shown in FIGS. 5 and 6 in conjunction with the explanation to follow.

Now, in response to a bus request signal REQ on line 22 (namely line 22 goes low), the output of NAND gate 41 changes state, causing a zero to be clocked into flip-flop 42 at the next bus clock pulse BCLK on line 34. One bus clock-pulse BCLK later, namely two bus clock pulses BCLK subsequent to the application of a request signal REQ on line 11, the zero that is loaded in the Q stage of flip-flop 42 is clocked into flip-flop 43, causing its $\overline{Q}$ output to change from a low state to a high state. This high signal on line 44 causes two things to happen. In the first instance, it places a one at one of the inputs of NAND gate 45 and removes the clear input from flip-flop 48. The previous low input on line 44 had caused a "1" to be placed on line 31 at the output of NAND gate 45, the "1" level being inverted by inverter 54 to a "0" at one input of NOR gate 71. It also applies a one to each of the inputs of NAND gates 61–64. The outputs of NAND gates 61–63 are zero by virtue of the zero signals coupled over lines BID 3–BID 1, so that the outputs of NOR gates 65–67 are all zeros. The output of NAND gate 64 is a zero, coupling a zero to one input of NOR gate 68, whereas because the BID 0 line is a one, NOR gate 68 supplies a zero at its output. This means that each of the inputs to NOR gate 71 is a zero, causing a one to be coupled to the D input of flip-flop 48. At the next bus clock pulse BCLK, this one is clocked into flip-flop 48, causing its Q output to go high and its $\overline{Q}$ output to go low. The change in state of the Q output of flip-flop 48 is coupled over line 51, so that a one now appears at each of the inputs of NAND gate 45 and each of the inputs of NAND gate 52.

Since both inputs to NAND gate 45 are now "1", its output changes from high to low, causing a select acknowledgement signal SACK to be asserted on line 31. As the output of NAND gate 45 is an open collector output, this zero level is applied to inverter 54 in each of the bus exchange control circuits, causing a "1" to be applied via line 55 to each NOR gate 71 and thereby inhibiting further arbitration by any bus exchange control circuit. Note also that the low level or "0" at the Q output of flip-flop 48 is coupled over line 46 to its preset input, so that, in effect, the previously clocked-in "1" output of NOR gate 71 is captured until flip-flop 48 is cleared.

The "1" level at the Q output of flip-flop 48 coupled over line 51 to NAND gate 52 also means that a zero is coupled from the output of NAND gate 52 to the inverting hard-set input of flip-flop 53, whereupon flip-flop 53 is set. The setting of flip-flop 53 causes two things to happen. On the one hand, via inverter 56, a busy signal BUSY is applied over line 32 to each of the bus exchange control circuits along the bus, informing them that one of the masters along the bus has obtained control of the link and therefore the link is busy. The Q output of flip-flop 53, on the other hand, changes states and supplies a bus control grant signal GRANT over line 23 to the master, so that it may then proceed to transmit.

The grant signal GRANT on line 23 also causes the output of NAND gate 41 to change state from low to high. As a result, at the next bus clock signal BCLK a "1" is clocked into flip-flop 42 causing its Q output to go high. At a second sebsequent bus block signal BCLK, the "1" output of flip-flop 42 is clocked into flip-flop 43, causing its $\overline{Q}$ output on line 44 to go low. This low signal on line 44 disables NAND gates 61 to 64 and causes the output of NAND gate 45 to go from low to high. As a result, the select acknowledge signal SACK is no longer asserted on line 31, so that an arbitration cycle may be carried out for another requesting master. The low level on line 44 also clears flip-flop 48, removing its preset input on line 46. The Q output of flip-flop 48 goes low applying a zero to NAND gates 45 and 52 via line 51. Thus, the outputs of both NAND gates 45 and 52 are high. The high output of NAND gate 52 removes the preset input to flip-flop 53. Note, however, that flip-flop 53 remains set until cleared by a release signal on line 24, so that BUSY is still asserted.

Once the master has completed its transmission, it applies a bus release signal over line 24 to clear flip-flop 53. The clearing of flip-flop 53 removes the busy signal BUSY from line 32 and again places a one on grant line 23. This effectively enables NAND gate 41 to be ready to accept a new bus request signal REQ on line 22 so that the control circuit is ready to handle a new bus access request REQ from its master.

Consider now the case where a plurality of masters are asserting a bus request signal REQ on the respective bus request lines 22 at substantially the same time. Within each master, the same scenario discussed above relative to the initial synchronization of the request signals REQ by way of the bus clock signal BCLK on clock line 34 takes place. Let it be assumed that the masters associated with card slot positions 0000 and 0001 are contending for the bus.

At card slot position number zero, namely at the card slot position having identification code 0000, each of the inputs to NAND gates 61–64 from the identification lines 25, will be a zero. Similarly, one of the inputs of each of NOR gates 65 will be a zero. In the master associated with card slot position number one, namely having identification address 0001, the three most significant bit identification lines of BID link 25 will be zero, while the least significant position corresponding to line BID 0 will be a one. As pointed out previously, NAND gates 61–64 are open collector gates coupled to bus request BREQ lines 33. For these two particular card slot positions, each of the bus request lines is connected together, as shown in FIG. 4. As a result, when the arbitration cycle initiation signal on line 44 is coupled through each of NAND gates 61–64, a zero will be applied over each of the bus request BREQ lines 33 from the master within card slot position number one. More specifically, NAND gate 64, at the least significant bit position for each of the zeroth and first card slot position masters, will receive a one on its associated input line 44. At the card slot position number zero, the other input to NAND gate 64 will be a zero, corresponding to the identification bit for the least significant bit position BID 0. For the master in the card slot position number one, however, the input to NAND gate 64 will be a one, so that with both of its inputs being a one, NAND gate 64 for the master in card slot position number one will produce a zero at its output. Since the bus request line BREQ 0 for each of the first and second card slot positions are connected in common, the zero at the output of the NAND gate 64 of the master at the card slot position number one will override the one at the output of NAND gate 64 for the card slot position number zero so that each of NOR gates 65–68 within the bus exchange control circuit of the master associated with the card slot position number one will be a zero, whereas NOR gate 68 in the bus exchange control circuit for card slot position number zero will produce a one at its output, preventing its NOR gate 71 from generating an output. On the other hand, within the bus exchange control circuit for card slot position number one, NOR gate 71 produces a "1" output, so that at the next bus clock pulse BCLK on line 34, the Q and $\overline{Q}$ outputs of flip-flop 48 change state, causing the respective SACK, BUSY, and bus grant GRANT signals to be generated on lines 31, 32 and 23, respectively, as discussed previously.

Thus, by virtue of the set of combinational logic shown in FIG. 3, using open collector NAND gates 61 and 64 and the manner of tying together of bus request lines on the backplane in the manner shown in FIG. 4, for a plurality of conflicting bus request signals, the master having the highest priority card slot position will always gain access to the bus and the processing of the requests may effectively proceed simultaneously under the synchronous control of signals on clock line 34 for each bus exchange control circuit. This means that all the signals which are generated, the select acknowledgement signals, the bus granting signals, the busy signals, etc., are produced synchronously throughout the system, so that there is no danger of granting priority to more than the highest priority master at a time; yet, the arbitration cycle carried out in those bus exchange control circuits, in which simultaneous requests for control of the bus, or substantially simultaneous requests for control of the bus, are received, may be processed concurrently. This substantially enhances the operation speed of the system, in that sequential scanning is not employed, and with each of the bus exchange control circuits being identically configured, the need for additional hardware for a serial lock-out scheme commonly employed in the prior art to establish priority is not required.

While I have shown and described one embodiment in accordance with the present invention, it is understood that the same is not limited thereto but is susceptible of numerous changes and modifications as are known to a person skilled in the art, and I therefore do not wish to be limited to the details shown and described herein but intend to cover all such changes and modifications as are obvious to one of ordinary skill in the art.

What is claimed:

1. For use in a data communication system wherein a plurality of master devices communicate over a common bus, a priority resolution circuit associated with each master device for resolving priority among the master devices, when more than one is seeking access to the bus, comprising:
    first means for receiving a master identification code from its associated master device representative of the priority of said associated master device relative to the other master devices that are coupled to the bus;
    second means, coupled to each master device among said plurality of master devices, for selectively coupling a first code, defined in accordance with said master identification code received by said first means, to said plurality of master devices;
    third means, responsive to a request for access to said bus by said associated master device, for causing said second means to couple said first code to said plurality of master devices; and
    fourth means, coupled to said second means, for selectively enabling said associated master device to gain access to said bus in response to the master identification code of said associated master device having the highest priority with respect to the identification code of any other master whose first code has been selectively coupled to each of said plurality of master devices.

2. A priority resolution circuit according to claim 1, wherein said fourth means comprises means, coupled to said plurality of master devices, for preventing said associated master device from gaining access to said bus during the time that another master device is controlling the bus.

3. A priority resolution circuit according to claim 1, wherein said fourth means comprises means, coupled to said plurality of master devices, for enabling said associated master device to gain access to said bus as long as no other master device is controlling the bus.

4. A priority resolution circuit according to claim 1, wherein said fourth means includes means, coupled to said plurality of master devices, for preventing any other master device from gaining access to the bus as long as said associated master is controlling the bus.

5. A priority resolution circuit according to claim 3, wherein said fourth means includes means for preventing any other master device from gaining access to the bus as long as said associated master is controlling the bus.

6. A priority resolution circuit according to claim 1, wherein said fourth means includes means, coupled to said first means, for comparing the master identification code of said associated master device with the first code of any other master device that has been selectively coupled to said plurality of master devices and coupling, to said plurality of master devices, a first prescribed output signal in response to the master identification of said associated master having the highest priority relative to that of the master identification code of said any other master.

7. A priority resolution circuit according to claim 6, further including fifth means, responsive to the receipt of a first prescribed output signal from another priority resolution circuit, for preventing said fourth means from enabling said associated master device to gain access to said bus.

8. A priority resolution circuit according to claim 6, wherein said comparing means includes means for producing a second prescribed output signal representative of whether or not the master identification code of said associated master has the highest priority relative to that of the master identification code of said any other master.

9. A priority resolution circuit according to claim 8, wherein said fourth means further includes means, coupled to said comparing means, for selectively enabling said associated master to gain access to said bus in accordance with the content of said second prescribed output signal.

10. A priority resolution circuit according to claim 9, wherein said selectively enabling means includes means for selectively preventing any other master device from gaining access to said bus in dependence upon the content of said second prescribed output signal.

11. A priority resolution circuit according to claim 6, wherein said first means comprises a first plurality of lines over which there are coupled the respective components by which the master identification code of said associated master device is defined, and wherein said system further comprises a second plurality of lines, selectively coupled in parallel to the master devices among said plurality, to which respective components of the first code associated with the master identification code received by said first means are selectively coupled by said second means.

12. A priority resolution circuit according to claim 11, wherein said second means comprises gate means, coupled to said third means, for causing the respective components of the first code associated with the master identification code of said associated master device on said first plurality of lines to be coupled to said second plurality of lines.

13. A priority resolution circuit according to claim 12, wherein said gate means includes means for coupling the complement of the master identification code on said first plurality of lines to said second plurality of lines.

14. A priority resolution circuit according to claim 13, further including fifth means, for interconnecting the respective lines of said second plurality of lines in accordance with a prescribed pattern.

15. A priority resolution circuit according to claim 14, wherein said second plurality of lines are formed of an N number of lines, where $2^N$ encompasses the number of master devices coupled to said bus, and wherein said fifth means includes means for interconnecting a respective $i^{th}$ line for a respective master device to the $i^{th}$ line of a number $(2^i-1)$ of adjacent master devices, where $1 \leq i \leq N$.

16. A priority resolution circuit according to claim 1, further comprising fifth means, coupled to said second, third, and fourth means, for synchronizing the operation thereof with respect to each priority resolution circuit.

17. For use in a data communication system wherein a plurality of master devices are coupled to communicate over a common bus, a priority resolution circuit associated with each master device for resolving priority among the master devices, when more than one is seeking access to the bus, comprising:

first means for receiving a master identification code from its associated master device representative of the priority of said associated master device relative to the other master devices that are coupled to the bus;

second means, coupled to each master device among said plurality of master devices, for selectively coupling a first code defined in accordance with said master identification code received by said first means to said plurality of master devices;

third means, responsive to a request for access to said bus by said associated master device, for causing said second means to couple said first code to said plurality of master devices; and fourth means, coupled to said second means, for granting priority for access to said bus to said associated master device in response to the master identification code of said associated master device having the highest priority with respect to the identification code of any other master device whose first code has been selectively coupled to each of said plurality of master devices.

18. A priority resolution circuit according to claim 17, wherein said fourth means includes means, coupled to said first means, for comparing the master identification code of said associated master device with the first code of any other master device that has been selectively coupled to said plurality of master devices and coupling, to said plurality of master devices, a first prescribed output signal in response to the master identification of said associated master having the highest priority relative to that of the master identification code of said any other master.

19. A priority resolution circuit according to claim 18, further including fifth means, responsive to receipt of a first prescribed output signal from another priority resolution circuit, for preventing said fourth means from granting priority for access to said bus to said associated master device.

20. A priority resolution circuit according to claim 19, wherein said comparing means includes means for producing a second prescribed output signal representative of whether or not the master identification code of said associated master has the highest priority relative to that of the master identification code of said any other master.

21. A priority resolution circuit according to claim 18, wherein said first means comprises a first plurality of lines over which there are coupled the respective components by which the master identification code of said associated master device is defined, and wherein said system further comprises a second plurality of lines, selectively coupled in parallel to the master devices among said plurality, to which respective components of the first code associated with the master identification code received by said first means are selectively coupled by said second means.

22. A priority resolution circuit according to claim 21, wherein said second means comprises gate means, coupled to said third means, for causing the respective components of the first code associated with the master identification code of said associated master device on said first plurality of lines to be coupled to said second plurality of lines.

23. A priority resolution circuit according to claim 22, wherein said gate means includes means for coupling the complement of the master identification code on said first plurality of lines to said second plurality of lines.

24. A priority resolution circuit according to claim 23, further including fifth means for interconnecting the respective lines of said second plurality of lines in accordance with a prescribed pattern.

25. A priority resolution circuit according to claim 24, wherein said second plurality of lines are formed of an N number of lines, where $2^N$ encompasses the number of master devices coupled to said bus, and wherein said fifth means includes means for interconnecting a respective $i^{th}$ line for a respective master device to the $i^{th}$ line of a number $(2^i-1)$ of adjacent master devices, where $1 \leq i \leq N$.

26. A priority resolution circuit according to claim 17, further comprising fifth means, coupled to said second, third, and fourth means, for synchronizing the operation thereof with respect to each priority resolution circuit.

* * * * *